United States Patent Office 3,699,086
Patented Oct. 17, 1972

3,699,086
PHOTO-CROSSLINKABLE ESTERS OF β-SUBSTITUTED α-CYANACRYLIC ACIDS AND PROCESS FOR THEIR MANUFACTURE
Albrecht Moschel, Kelkheim, Taunus, Walter Luders, Neu-Isenburg, and Hartmut Steppan, Wiesbaden, Germany, assignors to Kalle Aktiengesellschaft, Wiesbaden-Biebrich, Germany
No Drawing. Filed Mar. 19, 1969, Ser. No. 808,640
Claims priority, application Germany, Mar. 20, 1968, P 17 70 003.7
Int. Cl. C08f 27/12
U.S. Cl. 260—78.4 D  9 Claims

ABSTRACT OF THE DISCLOSURE

The present invention relates to esters of β-substituted α-cyanacrylic acids obtained by the conversion of polyhydric alcohols, for example polyvinyl alcohols, with β-substituted α-cyanacrylic acid chlorides, for example benzylidene-α-cyanacetic acid chloride, with the exclusion of short wave-length light, which esters are crosslinkable on exposure to radiation. The esters are used for the manufacture of photocrosslinkable layers, coatings and shaped articles.

---

The present invention relates to photo-crosslinkable esters of β-substituted α-cyanacrylic acids and to a process for their manufacture.

It has already been described that esters of β-substituted acrylic acids and the vinylogous homologues thereof, especially cinnamic acids, can be cross-linked with polymers containing hydroxyl groups on exposure to radiation with ultraviolet light to yield films which are insoluble in solvents. These compounds, especially the cinnamates of polyvinyl alcohol and the partially saponified polyvinyl acetates, are used in industry to produce photo-crosslinkable layers which may be employed in copying technology and for the so-called "photo-resist resins" (cf. Minsk et al., J. Appl. Polymer Sci. 2, p. 304 (1959)).

Attempts have been made to replace the aforementioned polyvinyl cinnamates, which are relatively insensitive in the range of the strong bands of the mercury lamps situated in the adjacent ultraviolet range, by products which are more sensitive to light. However, the cinnamates substituted at the phenyl nucleus, which absorb in higher degree in the corresponding ultraviolet range, are either difficult to obtain on an industrial scale or they have a poor storage stability.

It has already been described in U.S. Pat. 2,861,057 to convert polymers containing hydroxyl groups with derivatives of phthalic anhydride to yield 3- or 4-(α-cyancinnamido)-phthalates. It has, moreover, been described in U.S. Pat. 2,824,084 to react copolymers of styrene and maleic anhydride with 4-hydroxy-ethoxy-α-cyancinnamic acid or the lower alkyl esters thereof. Also these compounds are difficult to obtain on an industrial scale since their synthesis proceeds via a multistep process.

The conversion of polymers containing hydroxyl groups, especially those polymers which carry a great number of hydroxyl groups at the macromolecule, such as polyvinyl alcohol or partially saponified polyvinyl acetate, into their cinnamic acid esters generally takes place with the exclusion of short wave-length light by acylation with cinnamic acid chloride in anhydrous pyridine which is used simultaneously as a solvent and a catalyst. After dilution with water, the products are isolated by filtering the polyvinyl cinnamate, which is insoluble in pyridine-containing water, from the unreacted polyvinyl alcohol, pyridinium cinnamate and the pyridinium chloride formed. In the conversion of cinnamic acid chloride in pyridine, more than 95% of the acid chloride applied may be recovered without difficulty in the form of free cinnamic acid. The cinnamate group, therefore, is neither decomposed nor rearranged in the highly basic reaction medium. However, if cinnamylidene-α-cyanacetic acid chloride is treated in pyridine under the same reaction conditions, about 50% may still be recovered in the form of free cinnamylidene-cyanacetic acid, while the remainder is a substance which is insoluble in the usual organic solvents and in water but soluble in dimethyl formamide and which, according to the melting point range, the infra-red and ultra-violet spectra, has no similarity to the free cinnamylidene-cyanacetic acid. Under the highly basic reaction conditions, about half the α-cinnamylidene-α-cyano-acetyl-pyridinium chloride present in anhydrous pyridine is already rearranged or polymerized and loses its photochemical activity. Also in the case of α-cyanosorbic acid it is known that polymerization may take place in a highly basic medium (cf. K. Hamann, Angew. Chem. 60, page 61 (1948)). Such an instability of a reaction component normally prohibits the performance of a polymer-analogue reaction (wherein a water-soluble macro-molecular compound is treated to yield a likewise water-soluble macromolecular reaction product).

Now we have found a process for the manufacture of esters of β-substituted α-cyanoacrylic acids which are crosslinkable on exposure to radiation, which comprises reacting an acid chloride of Formula I

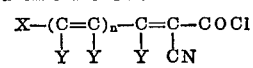

in which Y represents a hydrogen atom or an aliphatic alkyl radical containing 1 to 4 carbon atoms, X represents an aromatic, cycloaliphatic or heterocyclic radical with 5 to 14 ring members, respectively, which may be mono- or disubstituted by an alkyl- or alkoxy radical containing 1 to 6 carbon atoms, respectively, a halogen atom, a phenyl radical, a dialkyl amino group, the alkyl radicals of which contain 1 to 4 carbon atoms, respectively, or a methylene-dioxy-, carboxyl- or carboxylate group, n being zero or a whole number from 1 to 3, with polyfunctional aliphatic or araliphatic hydroxyl compounds whose carbon chain may be interrupted once or several times by an oxygen atom, an alkylamino-, acetal-, ester-, carbonic ester-, urethane-, amido- or urea group or bridged by an acetal group, with the exclusion of light of a wavelength of 2,000–6,000 angstrom units in polar solvents being miscible with water, in the presence of one or several tertiary amines at a temperature within the range of from −20° to +100° C., to yield an ester of β-substituted α-cyanacrylic acid having a mean molecular weight of from 500 to 5,000,000, preferably 25,000 to 2,000,000, which contains (a) the group

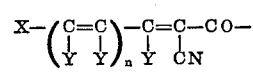

in which X, Y and n have the aforesaid meaning, in an amount of from 10% to 100%, preferably 40% to 98%, (b) the group R′–COO, in which R′ represents an aliphatic radical containing 1 to 8 carbon atoms or an aromatic radical containing 6 to 8 carbon atoms, in an amount of from 0 to 85%, preferably 2% to 50%, and (c) free hydroxyl groups in an amount of from 0% to 50%, preferably 1% to 30%, with the groups mentioned under (a) to (c) adding up to 100%.

As polar solvents which are miscible with water there may be used especially cyclic ethers, for example tetrahydrofuran and dioxan, and N-substituted amides of lower carboxylic acids, for example dimethyl formamide.

As tertiary amines there may be used aliphatic, cycloaliphatic and aromatic amines of low molecular weight, for example trimethylamine, triethylamine, tri-n-propylamine, dimethyl cyclohexylamine, N-methyl-piperidine, N-methyl-morpholine, pyridine or mixtures thereof, pyridine being especially preferred since it may be used both as a solvent and as a tertiary amine.

Moreover, to accelerate the reaction there may be added especially nucleophilic tertiary amines to the tertiary amine or the mixture of tertiary amine and the aforesaid polar solvents in an amount of from 0.01 to 5% by weight, preferably 0.05 to 0.5% by weight, calculated on the solvent. There are especially used aliphatic tertiary amines with alkyl groups containing 1 to 3 carbon atoms, bicyclic tertiary amines with 7 to 10 ring members and diamines of Formula II $$(CH_3)_2N-A-N(CH_3)_2$$

in which A means a bivalent hydrocarbon radical containing 2 to 6, preferably 4 to 6 carbon atoms, whose carbon chain may be interrupted by one or more oxygen atoms or methyl amino groups. There may be mentioned trimethyl amine, 1,4 - diazabicyclo-[2,2,2]-octane, N,N'-tetramethyl-1,4-diaminobutane, N,N'-tetramethyl - 1,4-diaminobutene-(2) and 2,2' - bis-(dimethylamino)-diethyl ether.

By polyfunctional hydroxyl compounds there is to be understood not only low molecular weight aliphatic tri- and polyhydric alcohols as well as their alkoxylation products but also high molecular weight compounds having a great number of hydroxyl groups, especially polyvinyl alcohols, vinyl alcohol copolymers with vinyl esters or olefins, polyether alcohols, telomers of allyl alcohol with monomers containing vinyl groups, cellulose and cellulose esters, condensation products of bisphenol A with epichlorohydrin, condensation products of glycidol and polyfunctional phenols as well as polyamines, polyacetals, polyesters, polyurethanes, polyamides and polyureas containing hydroxyl groups.

As polyfunctional hydroxyl compounds there may be used aliphatic tri- and polyols, for example glycerin, trimethylol ethane, trimethylol propane, pentaerythrite, pentites and hexites, furthermore polyether alcohols, for example dipentaerythrite, as well as alkoxylation products of the aforesaid alcohols, for example propoxylated trimethylolpropane having a molecular weight of from 300 to 750, propoxylated pentaerythrite having a molecular weight of from 380 to 750 and propoxylated pentites and hexites.

As hydroxyl compounds there may furthermore be used those compounds which may be obtained by telomerizing allyl alcohol with monomers containing vinyl groups, for example telomers of allyl alcohol with styrene having a mean molecular weight within the range of from 1,000 to 5,000, preferably 1,200 to 2,000.

Polyvinyl alcohols and copolymers of vinyl alcohol with vinyl acylates are of special importance, which are obtained by incomplete saponification of polyvinyl acylates or subsequent acylation of polyvinyl alcohols with acid chlorides derived from monobasic, unbranched or branched aliphatic carboxylic acids containing 2 to 8, preferably 2 or 3 carbon atoms. There are preferably used polyvinyl alcohols whose 4-percent by weight solution in water or in a mixture of water and methanol (weight ratio 1:1) has a viscosity of 2 to 25 centipoises/20° C. and whose saponification degree amounts to 45% to 99%, preferably 60% to 90%. In this process there have proved to be especially useful those polyvinyl alcohols whose 4-percent by weight solutions in water or in a mixture of water and methanol (weight ratio 1:1) have a viscosity of 3 to 18 centipoises/20° C. and which have a saponification degree of 60 to 90 percent.

As polyfunctional hydroxyl compounds there may be used, furthermore, copolymers of vinyl alcohol and ethylene which may also still comprise a residual portion of vinyl acetate incorporated by polymerization. Products of this type are obtained by copolymerization of vinyl acetate with ethylene and subsequent saponification. Products having a content of from 0.1 to 25 mole percent of ethylene have proved especially useful.

Cellulose may also be used as a hydroxyl compound, especially those types which are partially acetylated. There have proved especially suitable cellulose acetates having an acetyl content of from 20 to 40%, preferably 25% to 35%.

As hydroxyl compounds there have proved to be useful, furthermore, polyfunctional mixed aliphatic-aromatic ether alcohols of which there are mentioned especially the condensation products of bisphenol A and epichlorohydrin corresponding to Formula III

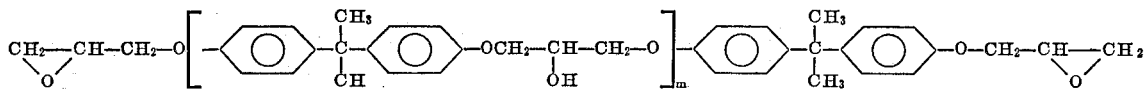

in which m is an integer of from 2 to 700, preferably 12 to 700, whose molecular weights are within the range of from 1,000 to 200,000, preferably 4,000 to 200,000, furthermore condensation products of glycide with polyfunctional phenols, i.e. compounds of Formula IV

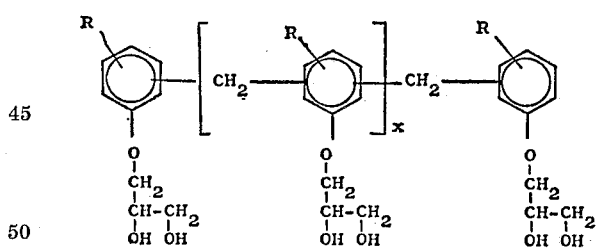

in which R represents a hydrogen atom or a methyl group and x is a whole number of from 1 to 20, preferably 2 to 10.

As compounds containing hydroxyl groups there may be mentioned, furthermore, those compounds formed by incomplete reaction of compounds of Formula III with 0.1 to 60 equivalent percent, calculated on the epoxide equivalent of compounds of Formula III, of an aliphatic, cycloaliphatic or aromatic anhydride at 140° to 160° C. As anhydrides there are used especially maleic anhydride, hexahydrophthalic anhydride, methylnadic anhydride, the product of the diene synthesis of maleic anhydride and methylcyclopentadiene and phthalic anhydride. Despite their molecular weight being considerably higher than that of the starting compounds, the epoxide resins obtained in the aforesaid manner still have a good solubility in pyridine and can be acylated at the numerous free hydroxyl groups.

As polyfunctional hydroxyl compounds there may be used, furthermore, compounds carrying OH groups whose carbon chain is interrupted once or several times by an alkylamino-, acetal-, ester-, urethane-, amido-, urea or carbonic ester group or bridged by a cyclic acetal group, i.e. by the groups

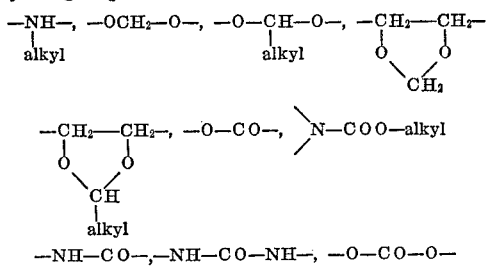

—NH—CO—, —NH—CO—NH—, —O—CO—O— in which "alkyl" stands for an aliphatic alkyl radical having 1 to 6, preferably 1 to 4 carbon atoms.

There may be mentioned, above all, polyesters, polyurethanes and polyamides containing hydroxyl groups.

By acid chlorides of Formula I there are to be understood β-substituted α-cyanacrylic acid chlorides and the vinylogous thereof, especially unsubstituted and nuclear-substituted benzylidene-α-cyanacetic acid chloride and the homologes thereof with 1 to 3 vinylene groups, i.e. compounds of Formula I in which Y represents a hydrogen atom and X represents a phenyl radical, which is unsubstituted or mono- or disubstituted by an alkyl- or alkoxy radical having 1 to 4 carbon atoms, respectively, a halogen atom, preferably a chlorine atom, a dimethyl amino group, a phenyl radical or a methylenedioxy radical.

There are preferably used benzylidene-α-cyanacetic acid chloride and cinnamylidene-α-cyanacetic acid chloride and the nuclear-substituted derivatives thereof, for example acid chlorides of 4-methylbenzylidene-α-cyanacetic acid,
3-methylbenzylidene-α-cyanacetic acid,
2-methylbenzylidene-α-cyanacetic acid,
4-ethylbenzylidene-α-cyanacetic acid,
4-isopropyl-benzylidene-α-cyanacetic acid,
4-chlorobenzylidene-α-cyanacetic acid,
3-chlorobenzylidene-α-cyanacetic acid,
2,4-dichlorobenzylidene-α-cyanacetic acid,
4-methoxybenzylidene-α-cyanacetic acid,
3-methoxy-benzylidene-α-cyanacetic acid,
2-methoxybenzylidene-α-cyanacetic acid,
3,4-methylenedioxy-benzylidene-α-cyanacetic acid,
4-phenyl-benzylidene-α-cyanacetic acid as well as of 4-methylcinnamylidene-α-cyanacetic acid,
3-methylcinnamylidene-α-cyanacetic acid,
2-methyl-cinnamylidene-α-cyanacetic acid,
4-ethyl-cinnamylidene-α-cyanacetic acid,
4-isopropyl-cinnamylidene-α-cyanacetic acid,
4-chloro-cinnamylidene-α-cyanacetic acid,
3-chlorocinnamylidene-α-cyanacetic acid,
2-chlorocinnamylidene-α-cyanacetic acid,
4-methoxy-cinnamylidene-α-cyanacetic acid,
3-methoxy-cinnamylidene-α-cyanacetic acid,
3,4-methylene-dioxy-cinnamylidene-α-cyanacetic acid.

There have proved to be suitable, furthermore, the acid chlorides of Formula I with $n$ being zero, in which X represents a higher condensed aromatic radical having 10 carbon atoms, especially acid chlorides of 1-naphthylidene-α-cyanacetic acid and 2-naphthylidene-α-cyanacetic acid.

There may be used, moreover, the acid chlorides of Formula I with $n$ being zero, or the whole number 1 or 2, in which X represents an unsaturated cycloaliphatic radical or a heterocyclic radical containing a nitrogen, oxygen or sulfur atom.

There may be mentioned especially the acid chlorides of Formula I with $n$ being zero or the whole number 1, in which X represents a furan radical, for example furanylidene-α-cyanacetic acid chloride and α-cyano-ω-furyldiene-carboxylic acid chloride.

Among the acid chlorides containing nitrogen there have to be mentioned above all the vinylogous iso-indolinyl compounds, i.e. compounds of Formula I in which X represents the heterocyclic radical

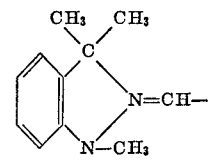

$n$ being zero or the whole number 1 and Y representing a hydrogen atom or a lower aliphatic radical of 1 to 4 carbon atoms.

The acid chlorides of Formula I to be used in the process of the invention are used either singly or in admixture with one another as well as in a mixture containing 0.1 to 20 mole percent, preferably 1 to 10 mole percent, calculated on the acid chlorides of Formula I, of non-photoactive acid chlorides of aliphatic carboxylic acids having 2 to 8 carbon atoms or of aromatic carboxylic acids having 7 to 10 carbon atoms. There may be used with special advantage the acid chlorides of branched aliphatic monocarboxylic acids, especially those of 2-ethyl-hexanoic acid, to improve the film-forming tendency of the photo-crosslinkable esters. The conversion of the aforesaid non-photoactive acid chlorides with the polyfunctional hydroxyl compounds may take place not only simultaneously with the reaction of the acid chlorides of Formula I but also previously or subsequently.

The acid chlorides of Formula I which may be employed according to the invention are obtained in known manner by converting the free carboxylic acids with thionyl chloride as halogenation agent and solvent, and by subsequent precipitation by dilution with low boiling aliphatic hydrocarbons such as pentane, hexane, heptane, octane, or the mixtures thereof.

The free carboxylic acids may be obtained by condensing the corresponding aldehydes with cyanacetic acid in an aqueous alkaline medium (cf. Organic Synthesis Col. Vol. I, page 181). They may be obtained, moreover, by condensation of the corresponding aldehydes with cyanacetic acid ester and careful alkaline saponification of the esters formed (cf. M. Coenen and M. Pestemer, "Zeitschrift für Elektrochemie," 57, page 791 (1953)).

A particularly preferred embodiment for the manufacture of the photo-crosslinkable esters consists of first dissolving or swelling the polymer containing hydroxyl groups in a 10-fold to 40-fold quantity of pyridine, adding a strongly nucleophilic amine, for example, 1,4-diazabicyclo-[2.2.2]-octane at a concentration of 0.01 to 1, preferably 0.1 to 0.5, percent by weight relative to pyridine, and adding an acid chloride of Formula I either in portions in the pure state or dissolved in a solvent which is inert but miscible with water and pyridine, for example dioxane, in a temperature range of between room temperature and 70° C., preferably between +45 and +60° C. After completion of the reaction the pyridinium chloride which has separated out is filtered off and the filtrate is allowed to run into the 10-fold to 20-fold quantity of water whilst stirring, in the course of which the compound either separates out directly in a filtrable form or can be obtained by extraction of the aqueous solution or dispersion. The reaction products thus obtained are largely purified from impurities, by-products and unreacted compounds containing hydroxyl groups by washing with water. Drying is effected under mild conditions under reduced pressure in the presence of conventional drying agents, for example phosphorus pentoxide.

The quantity ratio of the acid chloride of Formula I and the polyfunctional hydroxyl compound may lie within wide limits which are determined by the requisite light sensitivity of the products and lies in the range of 10.0 to 120, preferably 40.0 to 98.0, mole percent of acid chloride relative to the hydroxyl groups present.

The process of the present invention must be carried out with exclusion of short wavelength light in order to avoid premature cross-linking, that is to say in the absence of light in the wavelength range of 2000 to 6000 angstrom units.

The compounds obtained by the process of the present invention may be employed singly or in admixture with inert or cross-linkable fillers such as vinyl polymers and copolymers, epoxide resins, polyamides, polyurethanes, cellulose powder and cellulose acetates in a dissolved form for the manufacture of photo-crosslinkable layers, coatings and shaped articles to be used, for example, in copying technology. Layers of such high molecular weight products become selectively insoluble at the exposed sites after exposure to radiation and with the use of an original, whereas the unexposed sites remain soluble and can easily be removed by a suitable solvent.

The following examples serve to illustrate the invention, but they are not intended to limit it thereto.

The reactions described in the examples following hereunder were carried out in rooms which were only lighted by yellow light, with the exclusion of day-light.

The cross-linking of the compounds obtained by the process of the present invention was effected by exposing a 0.02 mm. thick film to the radiation of a xenon impulse lamp (wattage: 5 kilowatts) at a distance of 1 m. The duration of the irradiation was 5 to 15 minutes.

EXAMPLE 1

5.65 g. of a dried polyvinyl alcohol, of which a 4% strength by weight aqueous solution had a viscosity of 4 cp./20° C. and which had a degree of saponification of 88%, were swollen overnight at 100° C. in 50 ml. of anhydrous pyridine and subsequently diluted with a further 50 ml. of pyridine. After cooling the mixture to 50° C., 0.250 g. of diazabicyclooctane dissolved in 5 ml. of pyridine were added and 10.2 g. of benzylidene cyanacetic acid chloride were subsequently added in portions at this temperature. After stirring for a further 8 hours, the rather viscous mass was diluted with acetone to twice its volume, the pyridinium chloride was filtered off, and the filtrate was run into a 10-fold quantity of water, whilst stirring. The resulting product was filtered off with suction, very thoroughly washed with water and subsequently dried at 30° C. under reduced pressure over $P_2O_5$. 13 g. of a fibrous product were obtained which in the IR-spectrum showed strong bands at 1710 (ester), 1600 (aromatic structure) and 2220 cm.$^{-1}$ (nitrile) and in the US-spectrum showed a maximum at 302 m$\mu$ with an extinction of $$E_{1\,cm.}^{1\%} = 537 \text{ (dioxane)}$$

The product was entirely soluble in dioxane. A coating produced with this product on an electrolytically roughened aluminum sheet yielded a film which became insoluble in dioxane after an irradiation of a duration of 15 minutes.

EXAMPLE 2

1.41 g. of a dried polyvinyl alcohol of which a 4% strength by weight aqueous solution showed a viscosity of 4 cp./20° C. and which had a degree of saponification of 88%, were dissolved in 50 ml. of dimethyl-formamide at a temperature of about 100° C., then 50 mg. of diazabicyclooctane and 3.0 g. of triethylamine were added, and 5.4 g. of cinnamylidene cyanacetic acid chloride were dissolved in 30 ml. of benzene, the solution was added dropwise at 80° C. and the mixture was stirred for a further 6 hours at this temperature. The benzene was removed under reduced pressure, the product was filtered off with suction from the triethylammoniumchloride and the filtrate was allowed to run into 1 l. of water, with agitation; agitation was continued for one hour, the product was filtered off with suction and thoroughly rinsed with a quantity of about 1 l. of water and dried at 30° C. over $P_2O_5$ under reduced pressure. 4.5 g. of a brown amorphous product were obtained, which was soluble not only in warm acetone and dioxane but also in dimethyl formamide. The UV-spectrum showed a maximum at 343 m$\mu$ with an extinction of $$E_{1\,cm.}^{1\%} = 1330 \text{ (dioxane)}$$

The product was dissolved in dioxane; a film was produced which, after brief exposure to radiation (10 minutes), became insoluble in dioxane.

EXAMPLE 3

28.2 g. of a dried polyvinyl alcohol of which a 4% strength by weight aqueous solution showed a viscosity of 4 cp./20° C., and which had a degree of saponification of 88%, were swollen in 1 liter of pyridine overnight at 100° C., 1.0 g. of diazabicyclooctane was then added and a solution of 108 g. of cinnamylidene cyanacetic acid chloride in 200 ml. of doxane was added dropwise over the course of 3 hours at 50° to 55° C. The mixture was stirred for a further 5 hours at this temperature, allowed to stand overnight at 5° C., and the pyridinium chloride was filtered off. The filtrate was allowed to run into 8 liters of water, while stirring; the mixture was stirred for a further hour, and the product was filtered off with suction and thoroughly rinsed with 10 liters of water. Then the product was made into a paste with 250 ml. of methanol, and the product was filtered off with suction. After drying under reduced pressure (2 hours at 50° C.) and over $P_2O_5$ (overnight at 25° C.), 93 g. of a fibrous light yellow product were obtained which was completely soluble in dioxane and which in the UV-spectrum showed a maximum at 341 m$\mu$ with an extinction of $$E_{1\,cm.}^{1\%} = 1125 \text{ (dioxane)}$$

The product was dissolved in dioxane; a film was produced which, after brief exposure to radiation (10 minutes), became insoluble in dioxane.

EXAMPLE 4

2.30 g. of a dried polyvinyl alcohol of which a 4% strength by weight aqueous solution showed a viscosity of 3.9 cp./20° C., and which had a degree of sponification of 98%, were swollen in 50 ml. of pyridine overnight at 100° C., 50 ml. of pyridine and 200 mg. of N,N'-tetramethyl-1,4-diaminobutane were added, then there were first added dropwise, at 50° C., 2.45 g. of 2-ethylhexanoic acid chloride and then 7.6 g. of cinnamylidenecyanacetic acid chloride in portions, and the mixture was stirred for 8 hours at this temperature. 50 ml. of acetone were added thereto, the resulting mixture was filtered, and the filtrate was added dropwise to 3 liters of water. The mixture was stirred for another hour, the product was filtered off with suction and rinsed thoroughly with 3 liters of water. After drying under reduced pressure (2 hours at 50° C.) and over $P_2O_5$ (overnight at 30° C.), 4.35 g. of a fibrous, white-yellow product were obtained which had a good solubility in dimethyl formamide, dioxane and ketones, for example acetone, methyl ethyl ketone. The UV-spectrum showed a maximum at 346 m$\mu$ with an extinction of $$E_{1\,cm.}^{1\%} = 413 \text{ (dimethylformamide)}$$

A film was produced with this product which became insoluble in dioxane after short irradiation (10 minutes).

EXAMPLE 5

2.82 g. of a dried polyvinyl alcohol of which a 4% strength by weight aqueous solution had a viscosity of 7.0 cp./20° C., and which had a degree of saponification of 88%, were swollen in 50 ml. of pyridine overnight at 100° C., 50 ml. of pyridine and 100 mg. of diazabicyclooctane were added thereto and, at 50° to 55° C., 10.8 g. of cinnamylidene cyanacetic acid chloride were introduced in portions. The mixture was stirred at this temperature for 8 hours, allowed to stand overnight. 50 ml. of acetone were added thereto, and the resulting mixture was filtered. The filtrate was allowed to run into 3 liters of water while stirring, the mixture was stirred for a further hour, and the product was filtered off with suction and thoroughly rinsed with 3 liters of water. The product was made into a paste with 100 ml. of methanol and the product was filtered off with suction. After drying under reduced pressure (2 hours at 50° C.) and over $P_2O_5$ (overnight at 25° C.), 7.5 g. of fibrous yellow-white product were obtained which in the UV-spectrum showed a maximum at 343 m$\mu$ with an extinction of $$E^{1\%}_{1\,cm.}=1076 \text{ (dioxane)}$$

A film produced with this product became insoluble in dioxane after brief exposure to radiation (10 minutes).

EXAMPLE 6

The process was carried out in a manner analogous to that described in Example 5 except that first 0.8 g. of 2-ethylhexanoic acide chloride was added dropwise, then 9.8 g. of cinnamylidene cyanacetic acid chloride were introduced in portions. 1.5 grams of a product were obtained which in the UV-spectrum showed a maximum at 343 m$\mu$ with an extinction of $$E^{1\%}_{1\,cm.}=1043 \text{ (dioxane)}$$

A film produced with this product became insoluble in dioxane after brief exposure to radiation (10 minutes).

EXAMPLE 7

The process was carried out in a manner analogous to that described in Example 5 except that 2.82 g. of a dried polyvinyl alcohol were employed, of which a 4% strength by weight aqueous solution had a viscosity of 15.4 cp./20° C., and which had a degree of saponification of 88%. 5 g. of a product were obtained which had a good solubility in dioxane and in dimethyl formamide and which in the UV-spectrum showed a maximum at 341 m$\mu$ with an extinction of $$E^{1\%}_{1\,cm.}=1140 \text{ (dioxane)}$$

A film produced with this product became insoluble in dioxane after brief exposure to radiation (5 minutes).

EXAMPLE 8

The process was carried out in a manner analogous to that described in Example 5, except that 2.30 g. of a dried polyvinyl alcohol were employed, of which a 4% strength by weight aqueous solution had a viscosity of 18 cp./20° C., and which had a degree of saponification of 98%. After additional reprecipitation from a dioxane/water mixture, 6.0 g. of a fibrous, white-yellow product were obtained which was soluble in dioxane and in dimethyl formamide and which in the UV-spectrum showed a maximum at 343 m$\mu$ with an extinction of $$E^{1\%}_{1\,cm.}=1020 \text{ (dioxane)}$$

A film produced with this product became insoluble in dioxane after brief exposure to radiation (5 minutes).

EXAMPLE 9

The process was carried out in a manner analogous to that described in Example 5 except that 2.82 g. of a dried polyvinyl alcohol were employed of which a 4% strength by weight aqueous solution showed a viscosity of 21 cp./20° C., and which had a degree of saponification of 88%. 6.1 g. of a fibrous, white-yellow product were obtained, which product was completely soluble in dioxane and which in the UV-spectrum showed a maximum at 342 m$\mu$ with an extinction of $$E^{1\%}_{1\,cm.}=860 \text{ (dioxane)}$$

A film produced with this product became insoluble in dioxane after brief exposure to radiation (5 minutes).

EXAMPLE 10

2.82 g. of a dried polyvinyl alcohol of which a 4% strength by weight aqueous solution showed a viscosity of 15.4 cp./20° C., and which had a degree of saponification of 88%, were swollen in 50 ml. of pyridine overnight at 100° C. 50 ml. of pyridine and 100 mg. of diazabicyclooctane were added thereto and, at 50° C., 11.1 g. of p-methoxy-benzylidene-cyanacetic acid chloride were introduced in portions. Agitation was continued for 8 hours at this temperature and the product was worked up as described in Example 5. After reprecipitation from dioxane/water, washing and drying, 2.0 g. of a white fibrous product were obtained which in the UV-spectrum showed a maximum at 341 m$\mu$ with an extinction of $$E^{1\%}_{1\,cm.}=631 \text{ (dimethyl formamide)}$$

A film produced with this product became insoluble in dimethyl formamide after brief exposure to radiation.

EXAMPLE 11

The process was carried out in a manner analogous to that described in Example 10 except that 11.5 g. of p-isopropyl-benzylidene-cyanacetic acid chloride were employed. After reprecipitation from a dioxane/water mixture, washing and drying, 2.9 g. of a white fibrous product were obtained which in the UV-spectrum showed a maximum at 317 m$\mu$ with an extinction of $$E^{1\%}_{1\,cm.}=587 \text{ (dimethyl formamide)}$$

A film produced with this product became insoluble in dimethyl formamide after exposure to radiation (15 minutes).

EXAMPLE 12

2.82 g. of a dried polyvinyl alcohol of which a 4% strength by weight aqueous solution showed a viscosity of 3.9 cp./20° C., and which had a degree of saponification of 88%, were swollen in 50 ml. of pyridine overnight at 100° C. 50 ml. of pyridine and 100 mg. of diazabicyclooctane were added thereto and, at 50° C., 12.07 g. of $\alpha$-naphthylidene-cyanacetic acid chloride were introduced in portions. Agitation was continued at 50° C. for 8 hours and the product was worked up as described in Example 5. 5 g. of a fibrous white product were obtained which in the UV-spectrum showed a maximum at 358 m$\mu$ with an extinction of $$E^{1\%}_{1\,cm.}=216 \text{ (dimethyl formamide)}$$

A film produced with this product became insoluble in dimethyl formamide after exposure to radiation (15 minutes).

EXAMPLE 13

The process was carried out in a manner analogous to that described in Example 12 except that 14.1 g. of 3,4-methylenedioxy - cinnamylidene - cyanacetic acid chloride were employed. 11.7 g. of a light yellow, fibrous product were obtained which was soluble in dioxane and dimethyl formamide. In the UV-spectrum it showed a maximum at 352 m$\mu$ with an extinction of $$E^{1\%}_{1\,cm.}=639 \text{ (dimethyl formamide)}$$

A film produced with this product became insoluble in dimethyl formamide after exposure to radiation (15 minutes). However, swelling occurred to a high extent.

EXAMPLE 14

The process was carried out in the manner described in Example 12 except that 11.8 g. of 3,4-methylenedioxy-benzylidene-cyanacetic acid chloride were employed. 0.8 g. of a yellow product was obtained which in the UV-spectrum showed a maximum at 367 m$\mu$ with an extinction of $$E_{1\,cm.}^{1\%} = 302 \text{ (dimethyl formamide)}$$

A film produced with this product became insoluble in dimethyl formamide after exposure to radiation (15 minutes).

EXAMPLE 15

The process was carried out in the manner described in Example 12 except that 13.4 g. of p-phenyl-benzylidene-cyanacetic acid chloride were employed. 12.5 g. of a white fibrous product were obtained which showed in the UV-spectrum a maximum at 335 m$\mu$ with an extinction of $$E_{1\,cm.}^{1\%} = 722 \text{ (dimethyl formamide)}$$

A film produced with this product became insoluble in dimethyl formamide after exposure to radiation (15 minutes).

EXAMPLE 16

The process was carried out in the manner described in Example 12 except that 11.1 g. of 3-methoxy-benzylidene-cyanacetic acid chloride were employed. 11.0 g. of a white fibrous product were obtained which in the UV-spectrum showed a maximum at 304 m$\mu$ with an extinction of $$E_{1\,cm.}^{1\%} = 511 \text{ (dimethyl formamide)}$$

A film produced with this product became insoluble in dimethyl formamide after exposure to radiation (15 minutes).

EXAMPLE 17

In a reaction flask, 28.0 g. of a polyvinyl alcohol, of which a 4% strength by weight aqueous solution showed a viscosity of 4 cp./20° C. and which had a degree of saponification of 88%, were slowly introduced into 200 ml. of dimethyl formamide at 100° C. to 110° C., while stirring, and dissolved in the course of 15 minutes, 43.4 g. of the homogeneous mass were introduced into a 1 l. glass autoclave which was provided with stirrer, thermometer and proportioning pump, the autoclave was closed and 300 ml. of liquid trimethylamine were introduced at a controlled rate by means of a capillary tube. The autoclave was heated to 50° C. and the contents were stirred for one hour at a pressure of 3.2 atmospheres gage. Then a solution of 21.6 g. of cinnamylidene-cyanacetic acid chloride in a total of 130 ml. of dioxane, which had been preheated to 40° C., was introduced by pumping during the course of 2 hours at 50° C., whereby the pressure was lowered to 2.5 atmospheres gage. The reaction was allowed to proceed to completion at this temperature during the course of 1 hour, the pressure in the autoclave was released during the course of half an hour at 30° C., in which process the trimethylamine was collected in a cooling trap for reuse in a further reaction. The autoclave was flushed with nitrogen and opened, the product was discharged and the precipitated trimethyl ammonium chloride was filtered off, the filtered residue being rewashed with 50 ml. of dioxane. The filtrate was allowed to run into 3 l. of water during the course of 15 minutes, while stirring vigorously, 200 ml. of a salt solution were added and agitation was continued for one hour. The product was filtered off with suction, rinsed thoroughly with water and dried under reduced pressure over P$_2$O$_5$. 9.5 g. of a white-yellow, fibrous product were obtained which was completely soluble in dioxane, dimethyl formamide and ketones (acetone, methyl, ethyl ketone) and which in the UV-spectrum showed a maximum at 341 m$\mu$ with an extinction of $$E_{1\,cm.}^{1\%} = 1180 \text{ (dimethyl formamide)}$$

A film produced with this product became insoluble in dioxane after brief exposure to radiation (10 minutes).

EXAMPLE 18

9.04 g. of an acetyl cellulose having an acetyl content of 31.4% were swollen in 100 ml. of pyridine overnight at 100° C., 100 mg. of diazabicyclooctane were added thereto and, at 50° C., 10.8 g. of cinnamylidene cyanacetic acid chloride were introduced in portions. After stirring for a further 8 hours at this temperature, 50 ml. of acetone were added and the resulting mixture was filtered. The filtrate was allowed to run into 3 l. of water, the mixture was stirred for a further hour, the product was filtered off with suction, rinsed thoroughly with water and dried under reduced pressure at 30° C. over P$_2$O$_5$. 3.8 g. of a fibrous white product were obtained which in the UV-spectrum showed a maximum at 350 m$\mu$ with an extinction of $$E_{1\,cm.}^{1\%} = 235 \text{ (dimethyl formamide)}$$

A film produced with this product became insoluble in dimethyl formamide after brief exposure to radiation (10 minutes).

EXAMPLE 19

2.62 g. of a copolymer of ethylene and vinyl alcohol having a residual content of acetyl of 2.0% and a content of 14% of ethylene were swollen in 100 ml. of pyridine overnight at 100° C., 100 mg. of diazabicyclooctane were added and, at 50° C., 10.8 g. of cinnamylidene cyanacetic acid chloride were introduced in portions, and the process was continued as described in Example 18. 5.2 g. of a white, fibrous product were obtained which in the UV-spectrum showed a maximum at 350 m$\mu$ with an extinction of $$E_{1\,cm.}^{1\%} = 650 \text{ (dimethyl formamide)}$$

A film produced with this product became insoluble in dimethyl formamide after brief exposure to radiation (10 minutes).

EXAMPLE 20

The process was carried out as described in Example 10 except that 10.4 g. of furfurylidene-cyanacetic acid chloride were employed. After reprecipitation from a dioxane/water mixture, washing and drying, there were obtained 2.3 g. of a white, fibrous product which was soluble in dimethyl formamide. A film produced with this product became insoluble in dimethyl formamide after brief exposure to radiation.

EXAMPLE 21

50 g. of an epoxide resin having an epoxide equivalent of 4000 and a hydroxyl value of 0.40 were comminuted in the mortar and triturated with 0.77 g. of hexahydrophthalic anhydride. Then the mixture was cured on an aluminum sheet at 150° to 160° C. for one hour, cooled and pulverized.

12.5 g. of the product obtained were dissolved in 75 ml. of hot pyridine, 75 mg. of diazabicyclooctane were added and, at 50° C., 10.8 g. of cinnamylidene-cyanacetic acid chloride were introduced in portions; the mixture was stirred for a further 8 hours at 50° C. and filtered, and the filtrate was introduced dropwise into 2 l. of water during the course of 30 minutes, while stirring. The product which had precipitated in a microcrystalline form was stirred for another hour, the product was filtered off with suction and washed with a large amount of water until free from pyridine and then digested with 50 ml. of methanol. The product was filtered off with suction and dried at 30° C. under reduced pressure.

14.2 g. of a loose white product were obtained which in the UV-spectrum showed a maximum at 350 m$\mu$ with an extinction of $$E_{1\,cm.}^{1\%} = 164 \text{ (dimethyl formamide)}$$

Infrared analysis on the product showed an excess amount of free epoxide groups (1230 (s.), 830 (s.), 890 (w.)

cm.$^{-1}$). The product was soluble in organic solvents such as dioxane or dimethyl formamide. A film produced with this product became insoluble in dimethyl formamide after exposure to radiation (15 minutes).

EXAMPLE 22

A solution of 40% strength by weight of an epoxide resin having an epoxide equivalent of 80,000 in methyl ethyl ketone was first heated at the rotary evaporator and then at the oil pump at a maximum temperature of 100° C.

12.5 g. of the solid product were dissolved in 75 ml. of pyridine with heating, 75 mg. of diazabicyclooctane were added and, at 50° C., 10.8 g. of cinnamylidene cyanacetic acid chloride were introduced in portions. The mixture was stirred for a further 8 hours at 50° C. and worked up as described in Example 21. 12 g. of a light, fibrous white product were obtained which was also soluble in cold dioxane and possessed excellent film-forming properties. Its UV-spectrum showed a maximum of 342 m$\mu$ with an extinction of $$E_{1\ cm.}^{1\%} = 382 \text{ (dioxane)}$$

A film produced with this product became insoluble in dioxane after brief exposure to radiation (10 minutes).

EXAMPLE 23

4.52 g. of a dried polyvinyl alcohol of which a 4% strength by weight solution in water/methanol (weight ratio 1:1) showed a viscosity of 5.95 cp./20° C. and which had a saponification degree of 65%, where swollen in 100 ml. of anhydrous pyridine overnight at 100° C. After cooling to 50° C., 100 mg. of diazabicyclooctane were added and, at this temperature, a solution of 10.8 g. of cinnamylidene cyanacetic acid chloride in 25 ml. of dioxane was introduced dropwise during the course of 1 hour. The mixture was stirred for a further 7 hours at 50° C. and allowed to stand overnight at 20° C. The mixture was filtered, the filtrate was allowed to run into 2 l. of water, while stirring, agitation was continued for 1 hour, the product was filtered off with suction and thoroughly rinsed with about 2 l. of water. After drying under reduced pressure (2 hours at 50° C.) and over $P_2O_5$ (overnight), 10 g. of a fibrous, light-yellow product weer obtained which was completely soluble in dioxane and which in the UV-spectrum showed a maximum of 343 m$\mu$ with an extinction of $$E_{1\ cm.}^{1\%} = 1060 \text{ (dioxane)}$$

The product was dissolved in dioxane. A film produced with this product became insoluble in dioxane after brief exposure to radiation (10 minutes).

EXAMPLE 24

28.2 g. of dried polyvinyl alcohol of which a 4% strength by weight aqueous solution showed a viscosity of 3.9 cp./20° C. and which had a degree of saponification of 88%, were swollen in 1000 ml. of pyridine at 100° C. overnight, 20 g. of diazabicyclooctane were added and, at 50° to 55° C., a solution of 54.0 g. of cinnamylidene-α-cyanacetic acid chloride in 100 ml. of dioxane was introduced dropwise in the course of 2 hours. The mixture was stirred for a further 5 hours at 50° C., it was left overnight at room temperature and then filtered off from the insoluble portion. The filtrate was then introduced dropwise into 12 l. of an aqueous salt solution of 1% strength by weight during the course of 2 hours, the mixture was stirred for a further 2 hours, the product was filtered off with suction, rinsed thoroughly with about 10 l. of water, digested with 200 ml. of water and filtered off with suction. After drying under reduced pressure (2 hours at 50° C.) and over $P_2O_5$ (during the course of 2 days at room temperature), 45 g. of a fibrous, white-yellow product were obtained which was soluble in cold dimethyl formamide and in hot dioxane and which in the UV-spectrum showed a maximum at 346 m$\mu$ with an extinction of $$E_{1\ cm.}^{1\%} = 1190 \text{ (dimethyl formamide)}$$

The product was dissolved in dimethyl formamide. A film produced with this product became insoluble in dimethyl formamide after exposure to radiation (15 minutes).

EXAMPLE 25

5.07 g. of a dried polyvinyl alcohol of which a 4% strength by weight solution in a water/methanol mixture (weight ratio 1:1) had a viscosity of 9.62 cp./20° C. and which had a saponification degree of 60 percent, were swollen in 100 ml. of pyridine at 100° C. overnight, 100 mg. of diazabicyclooctane were added and, at 50° C., a solution of 10.8 g. of cinnamylidene-α-cyanacetic acid chloride in 25 ml. of dioxane were added dropwise during the course of 1 hour; the mixture was stirred for a further 7 hours at 50° C., left overnight at room temperature and then filtered off from the insoluble portion. During the course of half an hour the filtrate was introduced dropwise into 1 l. of water and the mixture was stirred for a further hour. The product was filtered off with suction, rinsed thoroughly with 1 l. of water, digested with 50 ml. of water and again filtered off with suction. After drying under reduced pressure (2 hours at 50° C.) and over $P_2O_5$ (2 days at room temperature), 10 g. of a fibrous, white-yellow product were obtained which was soluble in doxane and which in the UV-spectrum showed a maximum of 341 m$\mu$ with an extinction of $$E_{1\ cm.}^{1\%} = 955 \text{ (dioxane)}$$

The product was dissolved in dioxane. A film produced with this product became insoluble in dioxane after brief exposure to radiation (10 minutes).

EXAMPLE 26

4.36 g. of a dried polyvinyl alcohol of which a 4% strength by weight solution in a water/methanol mixture (weight ratio 1:1) had a viscosity of 9.51 cp./20° C. and which had a saponification degree of 66.5%, were swollen in 100 ml. of pyridine at 100° C. overnight, 100 mg. of diazabicyclooctane were added and, at 50° C., a solution of 10.8 g. of cinnamylidene-α-cyanacetic acid chloride in 25 ml. of dioxane were introduced dropwise during the course of 1 hour. The mixture was stirred for a further 7 hours at this temperature and left overnight at room temperature. The product was worked up as described in Example 25. 9.5 g. of a fibrous, white-yellow product were obtained which was photo-crosslinked as described in Example 25.

EXAMPLE 27

3.74 g. of a dried polyvinyl alcohol of which a 4% strength by weight solution in a water/methanol mixture (weight ratio 1:1) had a viscosity of 19.74 cp./20° C. and which had a degree of saponification of 73.8, were swollen in 100 ml. of pyridine at 100° C. overnight, 100 mg. of diazabicyclooctane were added and, at 50° C., a solution of 10.8 g. of cinnamylidene-α-cyanacetic acid chloride in 25 ml. of dioxane were added dropwise during the course of 1 hour. The mixture was tempered at this temperature for a further 7 hours and left overnight at room temperature. The product was worked up in a manner analogous to that described in Example 25, whereby 9 g. of a fibrous, white-yellow product were obtained which was photocrosslinked after brief exposure to radiation as described in Example 25.

EXAMPLE 28

7.11 g. of a polyvinyl alcohol of which a 4% strength by weight solution in a water/methanol mixture (weight ratio 1:1) showed a viscosity of 14.52 cp./20° C. and which had a saponification degree of 46.7%, were swollen in 100 ml. of pyridine overnight at 100° C., 100 mg. of diazabicyclooctane were added and, at 50° C., a solution of 10.8 g. of cinnamylidene-α-cyanacetic acid chloride in 25 ml. of dioxane was added dropwise during the course of 1 hour. The mixture was stirred for a further 7 hours at this temperature and left overnight at room temperature. The product was worked up in a manner analogous to that of Example 25 whereby 12 g. of a fibrous, white-yellow product were obtained which was photocrosslinked in the manner described in Example 25.

EXAMPLE 29

4.08 g. of a polyvinyl butyral whose acetal content was 70%, whose acetate content was 1%, whose content of polyvinyl alcohol was 25% and whose content of solid material was 98%, of which a 6% strength by weight solution in methanol showed a viscosity of 5 cp./20° C., were swollen together with 2.60 g. of cinnamylidene-α-cyanacetic acid chloride in 25 ml. of dioxane at room temperature and partially dissolved. At this temperature 0.79 g. of pyridine and 0.224 g. of diazabicyclooctane dissolved in 15 ml. of dioxane were introduced dropwise in the course of 10 minutes, while stirring, then the mixture was stirred for a further hour and left overnight. Then the emulsion was added dropwise to 300 ml. of water, while stirring vigorously. The mixture was filtered off with suction, the solid residue was dissolved in a small amount of cold dioxane, the solution obtained was filtered and the filtrate obtained added dropwise to 1.2 l. of water while stirring vigorously, and the whole was stirred for a further hour. The product was filtered off with suction, washed thoroughly with water and dried at 30° C. in the vacuum drying closet. 4.7 g. of a light yellow product were obtained which in the UV-spectrum had a maximum at 330 mμ with an extinction of $$E_{1\text{cm}}^{1\%} = 405$$

in dimethyl formamide and which was photo-crosslinked in the manner as described in Example 25 (exposure to radiation: 15 minutes).

The viscosity values indicated in the examples were determined in a falling ball viscosimeter according to Höppler.

The average molecular weights of the polyvinyl alcohols used, which were determined by extrapolation by means of the basic polyvinyl acetates, were within the range of about 20,000 to about 5,000,000.

We claim:
1. An ester of a β-substituted α-cyanacrylic acid and a polyfunctional aliphatic or araliphatic hydroxyl compound, said hydroxy compound having its carbon chain interrupted at least once by an oxygen atom, an alkylamino, acetal, carboxylic acid ester, carbonic acid ester, urethane, amido or urea group or bridged at least once by an acetal group, said ester having a mean molecular weight of from 500 to 5,000,000 and comprising
(a) the group

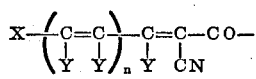

in which Y is a hydrogen atom or an aliphatic alkyl residue having 1 to 4 carbon atoms, X is an aromatic, cycloaliphatic or heterocyclic moiety each containing 5 to 14 ring members which may be substituted once or twice with an alkyl or alkoxy moiety having from 1 to 6 carbon atoms, a halogen, a phenyl moiety, a dialkylamino group of which the alkyl moiety each contains 1 to 4 carbon atoms, a methylenedioxy, carboxyl or carboxylate moiety, and $n$ is 0 or an integer from 1 to 3, wherein (a) in said ester is from 10 to 100 percent;
(b) the group R'—COO—, in which R' is an aliphatic moiety having 1 to 8 carbon atoms or an aromatic moiety having 6 to 9 carbon atoms, wherein (b) in said ester is in an amount of from 0 to 85 percent; and having
(c) free hydroxyl groups wherein (c) in said ester is in an amount from 0 to 50 percent, with the groups mentioned under (a) to (c) adding up to 100 percent.

2. The ester as defined in claim 1 and wherein the hydroxy compound is aliphatic polyhydric alcohols, alkoxylation products thereof; a polyvinyl alcohol, a vinyl alcohol copolymer with a vinyl ester or an olefin as a comonomer thereof; a polyether alcohol; telomers of allyl alcohol with comonomers having a vinyl group; cellulose or a cellulose ester; a condensation product of bisphenol A with epichlorohydrin or a condensation product of glycidol and a polyfunctional phenol.

3. The ester as defined in claim 2 and wherein the hydroxy compound is a polyvinyl alcohol.

4. The ester as defined in claim 2 and wherein said hydroxy compound is a polyvinyl alcohol having a viscosity of 3 to 18 centipoises at 20° C. in 4 percent by weight of solution in water and a saponification degree of 60 to 90 percent.

5. The ester as defined in claim 1 and wherein in the formula of group (a) X is a phenyl radical, a mono-substituted phenyl radical, a di-substituted phenyl radical and wherein a substituent on said phenyl radical is an alkyl, or an alkoxy radical of 1 to 4 carbon atoms, a halogen, a dialkylamino radical, a phenyl radical or a methylenedioxy radical.

6. The ester as defined in claim 1 and wherein a precursor of group (a) is benzylidene α-cyanacetic acid chloride.

7. The ester as defined in claim 1 and wherein a precursor of group (a) is cinnamylidene-α-cyanacetic acid chloride.

8. The ester as defined in claim 1 and wherein a precursor of group (b) is 2-ethyl-hexanoic acid.

9. The ester as defined in claim 1 and wherein a precursor of group (a) in said ester is a member selected from the group consisting of:
4-methylbenzylidene-α-cyanacetic acid,
3-methyl-benzylidene-α-cyanacetic acid,
2-methylbenzylidene-α-cyanacetic acid,
4-ethylbenzylidene-α-cyanacetic acid,
4-isopropyl-benzylidene-α-cyanacetic acid,
4-chlorobenzylidene-α-cyanacetic acid,
3-chlorobenzylidene-α-cyanacetic acid,
2,4-dichlorobenzylidene-α-cyanacetic acid,
4-methoxybenzylidene-α-cyanacetic acid,
3-methoxy-benzylidene-α-cyanacetic acid,
2-methoxybenzylidene-α-cyanacetic acid,
3,4-methylenedioxy-benzylidene-α-cyanacetic acid,
4-phenylbenzylidene-α-cyanacetic acid,
4-methylcinnamylidene-α-cyanacetic acid,
3-methylcinnamylidene-α-cyanacetic acid,
4-ethyl-cinnamylidene-α-cyanacetic acid,
4-isopropylcinnamylidene-α-cyanacetic acid,
4-chloro-cinnamylidene-α-cyanacetic acid,
3-chlorocinnamylidene-α-cyanacetic acid,
2-chlorocinnamylidene-α-cyanacetic acid,
4-methoxy-cinnamylidene-α-cyanacetic acid,
3-methoxy-cinnamylidene-α-cyanacetic acid,
3,4-methylene-dioxy-cinnamylidene-α-cyanacetic acid,
1-naphthylidene-α-cyanacetic acid,
2-naphthylidene-α-cyanacetic acid,
furanylidene-α-cyanacetic acid chloride,
α-cyano-ω-furyl-diene-carboxylic acid chloride, and
2-methylcinnamylidene-α-cyanacetic acid.

(References on following page)

References Cited

UNITED STATES PATENTS

| | | | |
|---|---|---|---|
| 3,329,664 | 7/1967 | Tsuda | 260—224 |
| 2,015,104 | 9/1935 | Dreyfus | 260—214 |

OTHER REFERENCES

Organic Syntheses, vol. 1, collective (rev. ed. of an. vol. I–IX), 1941 (p. 181).

Journal of Applied Polymer Science (J. of A.P.S.), vol. 2, issue No. 6, 1959 (pp. 302–307).

WILLIAM H. SHORT, Primary Examiner

T. E. PERTILLA, Assistant Examiner

U.S. Cl. X.R.

106—14.5; 117—127, 161 ZB; 204—159.12, 159.15; 260—17 R, 17.4 CL, 47 EP, 47 EQ, 73 R, 75 A, 77.5 CH, 77.5 AP, 78 UA, 85.7, 88.1 P, 91.3, 91.3 R, 91.3 VA, 212, 214, 346.1 R, 465 K, 465.4, 836, 857 R, 858, 881